United States Patent [19]

Foglar et al.

[11] Patent Number: 5,402,426
[45] Date of Patent: Mar. 28, 1995

[54] METHOD AND CIRCUIT ARRANGEMENT FOR CHECKING THE OBSERVANCE OF PRESCRIBED TRANSMISSION BIT RATES IN AN ATM SWITCHING EQUIPMENT

[75] Inventors: Andreas Foglar; Oliver Von Soosten, both of Munich, Germany

[73] Assignee: Siemens Aktiengesellschaft, Munich, Germany

[21] Appl. No.: 42,711

[22] Filed: Apr. 5, 1993

[30] Foreign Application Priority Data

Apr. 23, 1992 [DE] Germany .................. 42 13 431.5

[51] Int. Cl.⁶ ............................................. H04L 11/00
[52] U.S. Cl. ...................................... 371/20.1; 370/60; 370/94.1
[58] Field of Search ............... 371/20.1, 15.1, 57.2; 370/13, 60, 94.1

[56] References Cited

U.S. PATENT DOCUMENTS

| | | | |
|---|---|---|---|
| 3,906,151 | 9/1975 | Grossman et al. | 178/3 |
| 4,939,723 | 7/1990 | Harley, Jr. et al. | 370/84 |
| 5,138,607 | 8/1992 | Thiebaut et al. | 370/13 |
| 5,200,950 | 4/1993 | Foglar et al. | 370/16 |
| 5,216,669 | 6/1993 | Hofstetter et al. | 370/84 |
| 5,222,063 | 6/1993 | Foglar et al. | 370/60 |
| 5,317,561 | 5/1994 | Fischer et al. | 370/16 |

FOREIGN PATENT DOCUMENTS

| | | |
|---|---|---|
| 0381275 | 8/1990 | European Pat. Off. . |
| 0403995 | 12/1990 | European Pat. Off. . |
| 0481507 | 4/1992 | European Pat. Off. . |

OTHER PUBLICATIONS

"Controlling Congestion In B–ISDN/ATM: Issues And Strategies", Adrian E. Eckberg et al, IEEE Communications Magazine, vol. 29, No. 9, New York, Sep. 1991, pp. 64–70.

Primary Examiner—Charles E. Atkinson
Attorney, Agent, or Firm—Hill, Steadman & Simpson

[57] ABSTRACT

A check of the observance of prescribed transmission bit rates in an ATM switching equipment occurs using counter devices (RAM1, ALU) working according to the "leaky bucket" principle. These are individually allocated to virtual connections via the switching equipment (VA). The momentary counter readings of these counter devices are respectively decremented by a variable count value only upon arrival of a message cell of the respective virtual connection. This variable count value is proportional to the time difference between the arrival time of the respective message cell and the arrival time of the message cell of the same virtual connection that immediately preceded it. The transmission bit rates determined for the virtual connections are thereby allocated to defined bit rates classes. On the basis of this allocation, an individual proportionality factor that is utilized for the duration of the existence of the respective virtual connection for the calculation of the variable count value is calculated for each of the virtual connections on the basis of this allocation.

9 Claims, 2 Drawing Sheets

METHOD AND CIRCUIT ARRANGEMENT FOR CHECKING THE OBSERVANCE OF PRESCRIBED TRANSMISSION BIT RATES IN AN ATM SWITCHING EQUIPMENT

BACKGROUND OF THE INVENTION

The present invention is directed to a method and circuit arrangement for checking the observance of prescribed transmission bit rates of the individual virtual connections for asynchronous transmission of message cells of fixed length during the course of virtual connections in a switching equipment.

Such a method, also referred to as a "leaky bucket" method is disclosed by European Patent 0 381 275. This publication only teaches that a constant value that, for example, corresponds to a power of two is used as a proportionality factor in the formation of the variable count value for the decrementation of the momentary counter readings of the individual counter devices. However, what is not taught is how such a proportionality factor is to be in fact defined for the individual, virtual connections.

SUMMARY OF THE INVENTION

It is an object of the present invention to provide a method and circuit arrangement of the type initially described wherein the observance of prescribed transmission bit rates can be checked for the individual virtual connections given adequate precision and a low control or, respectively, circuit outlay.

In a method of the type initially cited, this object is achieved by a method for checking the observance of the transmission bit rates of individual virtual connections for an asynchronous transmission of message cells of fixed length during the course of virtual connections in a switching equipment. The switching equipment accepts the message cells via an offering media using counter devices individually allocated to the virtual connections. The respective, momentary counter reading of these counter devices are both incremented by a constant count value as well as decremented by a variable count value for an updating upon arrival of a message cell belonging to the allocated, virtual connection. The variable count value is proportional to the time difference between the time of arrival of the respective message cell and the time of arrival of a most recently received message cell of the same virtual connection serving as reference time and retained for the respective counter means. An upward transgression of a maximum allowable counter reading by the updated, momentary counter reading of the respective counter means is respectively individually monitored for the individual counter means as a criterion for an upward transgression of the transmission bit rate of the respective virtual connection. In the steps of the method: a separate bit rate class is respectively defined for a defined, minimum transmission bit rate and for whole multiples thereof; a normed numerical value 1 is allocated to the bit rate class corresponding to the minimum transmission bit rate and, by contrast, a normed numerical value corresponding to the whole multiple of the minimum transmission bit rate respectively under consideration is allocated to the remaining bit rate classes; each of the virtual connections is assigned to one of the bit rate classes based on the measure of the transmission bit rate respectively recited therefor; and a call-associated proportionality factor is utilized for the duration of the existence of the respective virtual connection for the calculation of the variable count value. The proportionality factor corresponds to the ratio of the normed count value allocated to the bit rate class under consideration to the normed count value allocated to the highest of the bit rate classes. The present invention yields the advantage that a linear relationship between the bit rate classes and the transmission bit rates prescribable for virtual connections exists on the basis of the definition of the bit rate classes. Thus, a call associated proportionality factor can be calculated for each of the virtual connections in a simple manner during the course of a respective call set up. The precision of the allocation of a transmission bit rate to a bit rate class is thereby prescribed by the normed numerical value allocated to the highest of the bit rate classes. After such an allocation, all updatings of the momentary counter readings of the individual counter devices can then be exactly implemented without round off errors.

In developments of the method of the present invention the time difference to be evaluated using the call-associated proportionality factor is calculated from momentary values of a time variable existing at the times of arrivals, the momentary value thereof changing within a periodical repeatedly sequencing counting cycle by one counting step after a respectively defined time interval. The transmission duration of a message cell is maximally selected at time intervals. Finally, in addition to the updating of the counter readings of the counter devices under consideration within a counting cycle undertaken in response to the arrival of message cells, the momentary counter readings of the individual counter devices are respectively decremented at least twice by the variable count value under consideration during the course of separate correction cycles and the momentary value of the count variables current at the moment is retained for the respective counter device as a new reference time. Furthermore, message cells are continuously transmitted via the offering media or dummy cells are transmitted in transmission pauses of message cells. The counter reading of the counter device allocated to the respective virtual connection is updated only in response to the arrival of a message cell. Finally, a correction cycle for one of the counter devices is additionally activated in response to the arrival of a message cell or dummy cell. The advantage is that, first, the counter means coming into consideration for the respective virtual connection is faultlessly updated on the basis of the periodically, repeatedly implemented correction of the momentary counter readings of the individual counter devices and of the time particulars defined as reference values, even when no message cells occur for a longer time span during the course of a virtual connection. Thus, the monitoring of the respective transmission bit rate can be faultlessly implemented. Second, a separate correction cycle involving all counter devices is avoided by the updating of the counter devices coming into consideration which is implemented upon appearance of a message cell and due to the simultaneous correction of the remaining counter devices. A further advantage is that the correction of the momentary counter readings of the counter devices is implemented in the same way as the decrementating of these momentary counter readings during normal updating.

In a circuit arrangement of the type initially cited, the aforementioned object is achieved by the features of the following described circuit. A plurality of counter devices corresponding to the maximum plurality of virtual connections proceeding via the offering media is respectively allocated to the offering media. The counter devices are respectively formed of an individual memory area of a read-write memory as well as of a calculating means connected to the read-write memory and shared in common by all counter devices. The momentary counter reading of the respective counter device, the maximum allowable counter reading, a time particular marking the time of the arrival of the most recent message cell of the respective virtual connection as well as the normed count value under consideration for the respective bit rate class or a call-associated proportionality factor can be stored in the individual memory areas as memory content. Upon appearance of message cells, the individual memory areas can be individually involved in a control cycle based on the measure of a cell header contained in these message cells and indicating the respective virtual connection. During the course of this control cycle the memory content of the respective memory area as well as a current time particular for the updating of the momentary counter reading of the respective counter means are first supplied to the calculating means, upon transgression of the maximum allowable counter reading contained in the memory content just supplied by the just updated counter reading the calculating means supplies an alarm signal indicating the upward transgression of the transmission bit rate of the respective virtual connection and the updated counter reading is decremented by the constant count value. Subsequently, at least the momentary counter reading, just updated by the calculating means and potentially decremented by the constant count value as well as the current time particular, can be transmitted into the respective memory area while overriding the previously stored, momentary counter reading or the previously stored time particular. The advantage is in the particularly low circuit-oriented outlay for the realization of the counter devices allocated to an offering medium. Further developments of the circuit arrangement of the present invention are as follows.

The current time particular is supplied by a central counter arrangement fashioned as a modulo-n counter. The current time particular is supplied in the form of a momentary counter reading, the counting period n thereof corresponding at least to twice the maximum plurality of virtual connections respectively proceeding via the offering media and the momentary counter reading thereof being respectively varied by one count step in successive time intervals that respectively correspond to the transmission duration of a message cell.

A further counter arrangement fashioned as a modulo-n counter is provided, the counting period n thereof corresponding to the maximum plurality of virtual connections proceeding via the respective offering medium and the momentary counter reading thereof being respectively varied by one count step in the successive time intervals. The memory areas of the read-write memory can be successively driven for a separate correction cycle by the continuously changing, momentary counter reading of the further counter arrangement. The memory content of the just driven memory area and the current time particular are supplied to the calculating means during the course of such a correction cycle. The calculating means first forms a time difference value weighted with the call-associated proportionality factor based on the measure of the time particular contained in the memory content supplied to it and based on the current time particular. The momentary counter reading also contained in the just supplied memory content is decremented by the time difference value for the formation of a corrected, momentary counter reading. At least the corrected, momentary counter reading as well as the current time particular can be transmitted into the memory area just driven while overwriting the momentary counter reading previously stored therein or the time particular previously stored therein. The memory area of the read-write memory under consideration for the respective message cell is involved in a control cycle for the duration of the appearance of message cells. Also, one of the memory areas of the read-write memory is involved in a correction cycle for the duration of the appearance of message cells or of dummy cells transmitted in transmission pauses of message cells.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
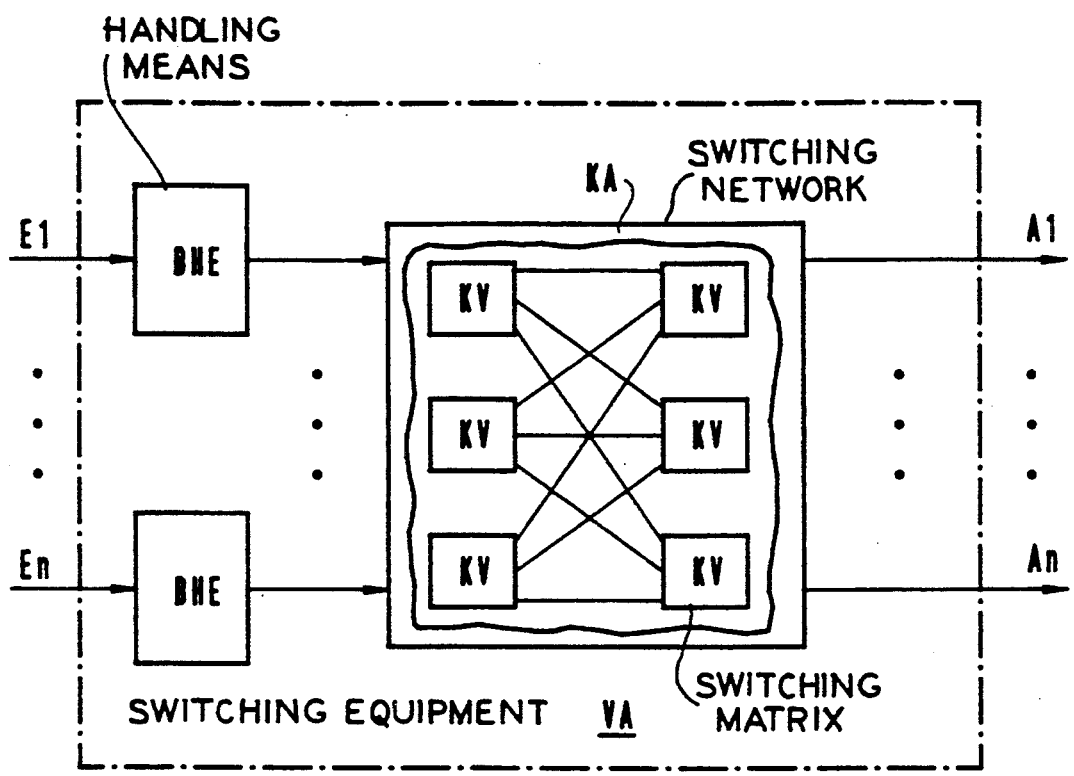
FIG. 1 is a block circuit diagram of ATM switching equipment incorporating the present invention.

FIG. 1 schematically shows switching equipment VA designed for asynchronous transfer mode (ATM) operation to which a plurality of offering media E1 through En as well as a plurality of serving media A1 through An are connected. The term "offering media" refers to the inlets of the switching equipment VA, and the term "serving media" refers to outlets of the switching equipment VA. Only the offering media E1 and En and the serving media A1 and An are shown in FIG. 1. These media, for example, can be subscriber lines or interexchange links. In the following, the offering media and the serving media shall be referred to as offering lines and serving lines, respectively.

A transmission of message cells during the course of virtual connections occurs according to an asynchronous transfer mode on the offering lines and serving lines. Let the message cells thereby be cells having a fixed length that respectively have a cell header wherein, among other things, a virtual channel number VCI or VPI/VCI that references the respective virtual connection, is contained as well as an information part available to them. The transmission of the actual message signals thereby occurs in the information part. What are thereby to be understood by message signals are data and text signals as well as voice or image signals in digital form. Let it also be pointed out that what are referred to as dummy cells are continuously transmitted on the offering and serving lines in transmission pauses of message cells, these dummy cells not being forwarded within the switching equipment.

As proceeds from FIG. 1, a separate handling means BHE is allocated to each of the offering lines E1 through En. Such a handling means BHE (whose structure shall be discussed in greater detail below) accepts the message cells transmitted via the allocated offering line during the course of virtual connections. Before forwarding them to a switching network KA, the handling means BHE implements a check of the observance of the transmission bit rate defined for the respective virtual connection in call-associated fashion. Merely as an example, a multi-stage structure having a plurality of switching matrices KV connected to one another is depicted in FIG. 1 for the switching network KA. However, any desired one-stage or multi-stage switching network can also be used. Since the structure and the functioning of such switching networks are known for the forwarding of message cells to the serving lines A1 through An in FIG. 1, this shall not be discussed in greater detail below.

Figure 2:
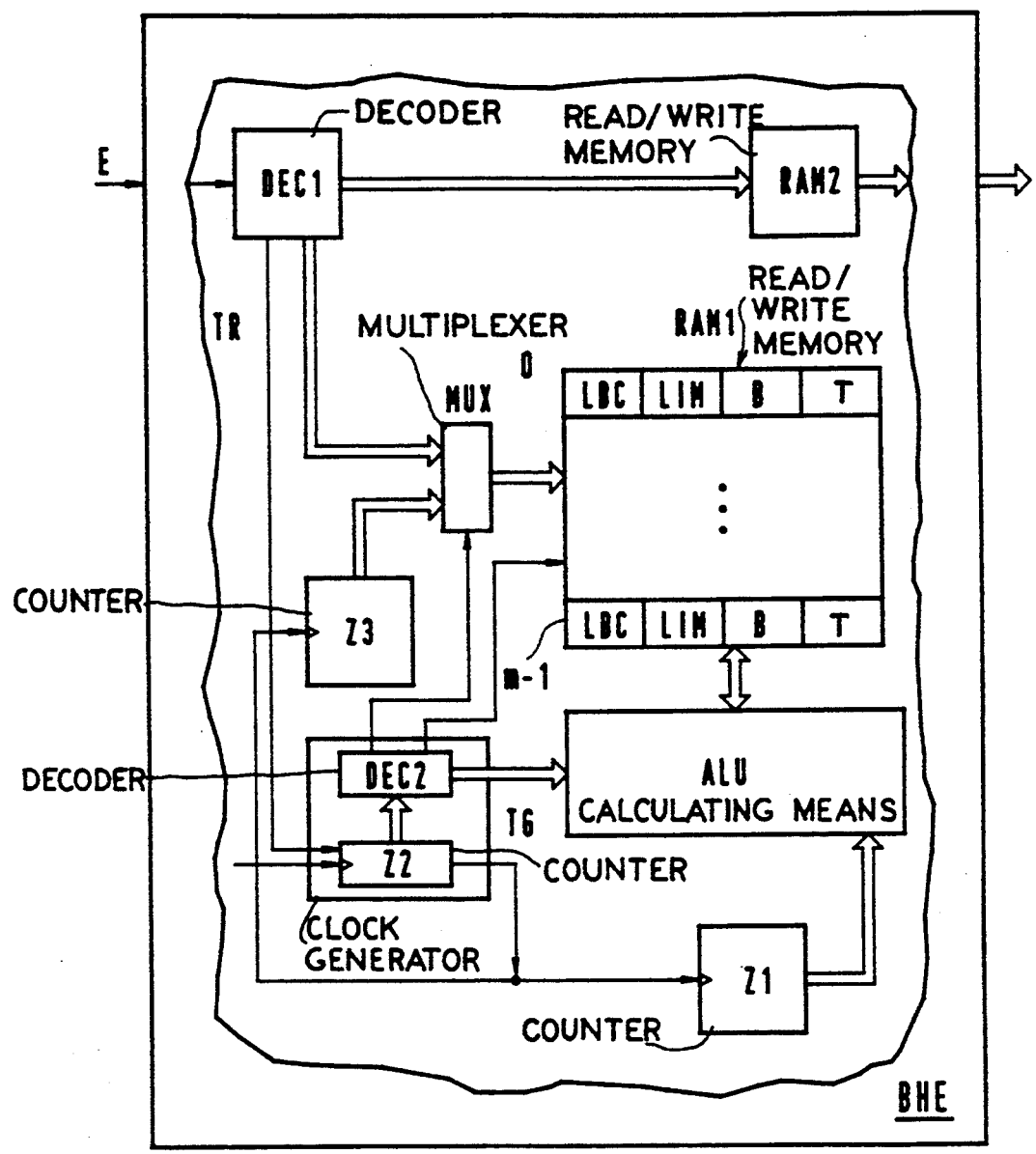
FIG. 2 depicts a structure of one embodiment of the handling devices that are only schematically shown in FIG. 1.

FIG. 2 shows a structure of one embodiment of the aforementioned, identically constructed handling devices BHE. Only those circuit parts that are necessary for an understanding of the present invention are thereby recited.

A decoder means DEC1 referenced E in FIG. 2 is connected to the respective offering line. This decoder means DEC1, first, recognizes the beginning of message cells transmitted in serial form and, second, combines bits respectively occurring in message cells to form bit groups having a respectively defined plurality of bits, for example 8 bits, and offering the individual bit groups (which are also referred to as octets below) in parallel form via a line system.

This decoder means is followed by a read-write memory RAM2. This is traversed by all message cells to be forwarded to the switching network KA. The delay time is thereby defined such that a check of the observance of the transmission bit rate defined for the respective virtual connection can be implemented before a forwarding of the just accepted message cell to the switching network KA. This delay time is implemented by the circuit arrangement set forth below.

The cell header of a message cell accepted in the read-write memory RAM2 is additionally decoded by the decoder means DEC1 in that address signals corresponding to the virtual channel number are contained in this cell header. These address signals are supplied to a second read-write memory RAM1 via first inputs of a multiplexer MUX. This read-write memory RAM1 has a separate memory area for each of the possible virtual connections on the appertaining offering line E. The individual memory areas can thereby be individually driven via the multiplexer MUX based on the representation of the virtual channel numbers contained in the message cells and decoded by the decoder means DEC1. When, for example, virtual connections referenced "0" through "m —1" can proceed over the appertaining offering line m, then memory areas referenced "0" through "m—1" are allocated thereto, as indicated in FIG. 2. These are respectively part of a counter means individually allocated to one of the respective virtual connections. The individual memory areas that are respectively subdivided into four memory segments thereby serve the purpose of storing a momentary counter reading LBC of the respective counter means (to be set forth later), a defined, maximum counter reading LIM, a time particular T, and a particular B that relates to the bit rate class for the respective virtual connection which is yet to be set forth below. This storing or the setting of the momentary counter reading LBC and of the time particular T to a defined initial value occurs under the control of a control means (not shown) that, for example, is connected to the read-write memory RAM1 via bus systems. In addition to an individual memory area of the read-write memory RAM1, a common calculating means ALU available to the individual counter means in multiplex operation also belongs to all counter means allocated to an offering line. This calculating means is in communication, first, with the read-write memory RAM1 via a first bus system and, second, with a counter means Z1 fashioned as a modulo-n counter via a second bus system. This continuously supplies the calculating means with changing, momentary counter readings as current time information which is yet to be set forth. Via a control line arrangement, the calculating means ALU is also supplied, from a clock generator TG, with control signals for the sequential implementation of arithmetic operations. At its output side, finally, this calculating means is in communication with a control input of the read-write memory RAM2.

The clock generator TG has a counter arrangement Z2 fashioned as a modulo-n counter which, on the one hand, is set to a defined initial counter reading via a control line TR at every appearance of a cell header belonging to a message cell or dummy cell. On the other hand, clock pulses whose clock period respectively corresponds to the duration of an afore-mentioned octet, given a maximum transmission bit rate defined for the respective offering line, are continuously supplied to this counter arrangement proceeding from a clock generator (not shown). The counting period n of this counter arrangement is defined in conformity with the plurality of octets respectively contained in the message cells or dummy cells. At the end of every such counting period, i.e. after the duration of a message cell or dummy cell, the counter arrangement Z2 outputs a counting pulse at an overflow output that is supplied to the counter arrangement Z1 and to a third counter arrangement Z3. Over and above this, a decoder means DEC2 belonging to the clock generator TG is supplied with the momentary counter readings of the counter arrangement Z2. At specific, momentary counter readings of the counter arrangement Z2, this decoder means forwards the aforementioned control signals to the calculating means ALU, write or read signals to the read-write memory RAM1, as well as rerouting signals to the afore-mentioned multiplexer MUX at whose second inputs counting outputs of the counter arrangement Z3 are connected. This counter arrangement, fashioned as a modulo-n counter, has a counting period that corresponds to the plurality of possible virtual connections on the respective offering line.

The structure of the handling means BHE shown in FIG. 2 has been set forth above. The functioning of such a handling means shall now be discussed in greater detail.

For the transmission of message cells during the course of virtual connections, bit rate classes B for a defined, minimum transmission bit rate and for a whole multiple of this minimum transmission bit rate are defined within the switching equipment VA shown in FIG. 1. The bit rate class corresponding to the minimum transmission bit rate thereby has a normed numerical value 1 allocated to it. By contrast, a normed numerical value corresponding to the whole multiples of the minimum transmission bit rate under consideration is thereby allocated to the remaining bit rate classes.

Given the assumption of a minimum transmission bit rate of, for example, 16.17 bit/s and a maximum transmission bit rate of 135.632 Mbit/s, this means that the bit rate class 1 corresponds to a transmission bit rate of 16.17 bit/s, the bit rate class 2 corresponds to a transmission bit rate of 32.34 bit/s and the bit rate class 8 388 560 ($2^{23}$) bit/s corresponds to a transmission bit rate of 135.632 Mbit/s. The following is generally valid for the selected example:

bit rate class $n = n \times 16.17$ bit/s, with $n = 1, 2 \ldots, 2^{23}$.

During the course of the set up of a virtual connection via one of the offering lines E1 through En shown in FIG. 1, the respective, calling subscriber means supplies particulars with respect to that transmission bit rate with which the subscriber means intends to transmit message signals during the course of the respective connection. On the basis of these particulars, the bit rate class under consideration is defined in the way just set forth in a control means (not shown in FIGS. 1 and 2) that controls the set up of virtual connections. Under the control of this control means, the bit rate class or the numerical value allocated thereto, is transmitted into the memory segment referenced B in that memory element of the read-write memory RAM1 that is allocated to the respective virtual connection. Over and above this, a maximum allowable counter reading is entered into the appertaining memory segment LIM. By contrast, a defined initial value, for example the value "0" for counter reading LBC and the current counter reading of the counter arrangement Z1 for time particular T are entered into the appertaining memory elements LBC and T. The maximum allowable counter reading is thereby based on the transit time fluctuations of message cells on the transmission paths from the respective subscriber transmission equipment up to the switching equipment VA. As an example, let transit time jitters in ATM multiplexers be cited.

The above-explained control procedures are implemented within the switching equipment VA at every set up of a virtual connection. When, during the course of a set up virtual connection, a message cell is supplied to the decoder means DEC1 (FIG. 2), this is then forwarded to the read-write memory RAM2 and is initially intermediately stored thereat. Based on the representation of the virtual channel number contained in the cell header of this message cell, the memory area of the read-write memory RAM1 under consideration for the respective virtual connection is additionally driven for a read cycle via the multiplexer MUX from the decoder means DEC1. The memory content of the driven memory element is thereby transmitted to the calculating means ALU. On the basis of this memory content, the latter then calculates a new counter reading $LBC(new) = [LBC - (B/Bmax) \Delta t] + 1$, where Bmax represents the highest of the bit rate classes and $\Delta t$ represents the difference between the time particular T supplied from the counter arrangement Z1 and contained in the memory. Over and above this, the bracketed expression $[LBC - (B/Bmax) \Delta t]$ means that this is set to the value "0" given a negative difference value. As already explained above, the counter arrangement Z1 offers the time particular in the form of a momentary counter reading. The counting period of this counter arrangement is derived from the plurality of virtual connections on the respective offering line to be maximally monitored. For example, a multiple of this plurality is defined as counting period n. As a result of the supplied counting pulses from the counter arrangement Z2, a counting period is traversed after a respective plurality n of message cells or dummy cells.

After the calculation of the momentary counter reading LBC(new), the calculating means ALU carries out a check to determine if this updated, momentary counter reading lies above the defined, maximum counter reading LIM. When this is the case, the message cell intermediately stored at the moment in the read-write memory RAM2 is destroyed in response to a control signal output by the calculating means ALU and the updated, momentary counter reading is decremented by the value 1. Otherwise, by contrast, the appertaining message cell is forwarded to the switching network KA.

After the check that has just been carried out, at least the updated, momentary counter reading or the decremented, momentary counter reading as well as the momentary counter reading supplied as a time particular from the counter arrangement Z1 are written back into that memory area of the read-write memory RAM1 that is driven at the moment, namely while overwriting the momentary counter reading LBC and the time particular T previously stored therein. The control cycle activated on the basis of the message cell supplied to the decoder means DEC1 is thus terminated in the handling means BHE shown in FIG. 2. Such a control cycle is then repeated with every appearance of a following message cell.

Moreover, let it also be pointed out that the calculating means ALU implements the afore-mentioned arithmetic operations and the check of the current counter reading in view of the observance of the defined, maximum counter reading sequentially in a prescribed sequence based on the measure of the control signals offered to the decoder means DEC2.

Following upon an afore-mentioned control cycle activated in response to the appearance of a message cell, a correction cycle in which one of the memory areas of the read-write memory RAM1 is involved also sequences within the duration of the appearance of a message cell. To that end, the multiplexer MUX is rerouted such that the momentary counter reading of the counter arrangement Z3 is now supplied to the read-write memory RAM1 as address signals. The memory content of the memory area driven as a result thereof is thereby transmitted to the calculating means ALU. The momentary counter reading LBC is updated based on the value of the momentary counter reading that is supplied from the counter arrangement Z1, according to:

$LBC(new) = [LBC - (B/Bmax) \Delta t]$. The time difference and the bracketed expression $[LBC - (B/Bmax) \Delta t]$ are thereby formed in the way already recited above. Following thereupon, at least the updated, momentary counter reading as well as the momentary counter reading supplied by the counter arrangement Z1 are written back into the memory area of the momentarily driven read-write memory RAM1, namely while overwriting the corresponding particulars stored therein. The correction cycle for the respective memory area has thus been terminated. Appropriate control signals are again supplied by the decoder means DEC2 for the sequential execution of this correction cycle.

Correction cycles corresponding to the correction cycle just set forth repeat at every appearance of a message cell or dummy cell in the decoder means DEC1. Since the momentary counter reading of the counter arrangement Z3 increments by one counting step with every appearance of a message cell or dummy cell, each of the memory cells of the read-write memory RAM1 are involved once in a correction cycle after the expiration of a full counting period of this counter arrangement. Such a periodic correction of the memory contents of the individual memory areas assures that an error-free updating of the respective, momentary counter reading in the individual memory areas and, thus, an error-free monitoring for the observance of prescribed transmission bit rates for the individual virtual connections are possible even for longer transmission pauses of message cells during the course of the individual virtual connections.

In the above-described exemplary embodiment, the bit rate class B allocated to the respective virtual connection is stored in the memory segment B of the individual memory areas of the read-write memory RAM1. However, one can also proceed such that the respective bit rate class is replaced by the quotient B/Bmax.

It was assumed above that a transmission bit rate is defined for each of the virtual connections. This transmission bit rate can be either a peak bit rate value or an average bit rate value. However, it is also possible to define both a peak bit rate value as well as an average bit rate value for each of the virtual connections. In this case, two separate memory areas, realized in the aforementioned manner, can be reserved in the read-write memory RAM1 for the respective, virtual connection in order to be able to separately monitor the observance of the average bit rate and of the peak bit rate for the respective virtual connection. The bit rate class coming into consideration is thereby separately calculated for the two bit rates and a normed numerical value or a quotient B/Bmax corresponding to the respective bit rate class B is stored. Both memory areas of the read-write memory RAM1 allocated to a virtual connection are then involved in a control cycle or correction cycle that is sequenced during the duration of the appearance of a message cell or dummy cell. This can occur sequentially upon involvement of the calculating means ALU shown in FIG. 2. However, it is also possible to use two calculating devices operating in parallel instead of this one calculating means.

Over and above this, it was assumed above that a virtual channel number VCI is respectively recited in the cell headers of message cells. Instead of such a virtual channel number, however, what is referred to as a virtual path number VPI or a combination of VPI and VCI can, for example, be provided. Independently of the nature of the identification of the individual message cells, the plurality of possible bit combinations can be significantly greater than the actual possible plurality m of virtual connections on the respective offering line on the basis of the bit plurality in the respective cell header provided for the identification. In order to limit the plurality of memory areas of the read-write memory RAM1 shown in FIG. 2 to the actual plurality m of virtual connections, it is expedient in this case to implement a transformation of the employed identifiers to the m possible virtual connections within the decoder means DEC1 and, thus, to the addresses of the memory areas "0" through "m−1" of the read-write memory RAM1 allocated thereto.

In conclusion, let it also be pointed out that only one possible exemplary embodiment of a means for checking the observance of prescribed transmission bit rates has been set forth with reference to FIG. 2. The above-explained principle of such a check, however, is also possible with counter arrangements individually allocated to the individual, virtual connections. These are capable of being realized with a circuit-oriented structure that deviates in comparison to FIG. 2.

What is claimed is:

1. A method for checking an observance of transmission bit rates of individual virtual connections for asynchronous transmission of message cells of fixed length during the course of virtual connections in a switching equipment, the switching equipment accepting the message cells via offering media by means of counter devices individually allocated to the virtual connections, a respective, momentary counter reading of said counter devices being both incremented by a constant count value as well as being decremented by a variable count value for an updating upon arrival of a message cell belonging to an allocated, virtual connection, said variable count value being proportional to a time difference between a time of arrival of a respective message cell and a time of arrival of a most recently received message cell of a same virtual connection serving as a reference time and being retained for the respective counter means, whereby an upward transgression of a maximum allowable counter reading by an updated, momentary counter reading of a respective counter means is respectively individually monitored for the individual counter means as a criterion for an upward transgression of the transmission bit rate of the respective virtual connection, comprising the steps of:

providing a plurality of bit rate classes and defining a separate bit rate class for a defined, minimum transmission bit rate and for whole multiples thereof;

allocating a normed numerical value of one to the bit rate class corresponding to the minimum transmission bit rate, and allocating, a normed numerical value corresponding to the whole multiple of the minimum transmission bit rate respectively under consideration to the remaining bit rate classes;

assigning each of the virtual connections to one of the bit rate classes based on the measure of the transmission bit rate respectively recited therefor; and utilizing a call-associated proportionality factor for a duration of an existence of a respective virtual connection for calculation of said variable count value, said proportionality factor corresponding to a ratio of a normed count value allocated to the bit rate class under consideration to a normed count value allocated to a highest of the bit rate classes.

2. The method according to claim 1, wherein the time difference to be evaluated with the call-associated proportionality factor is calculated from momentary values of a time variable existing at the said times, the momentary value thereof changing within a periodically, repeatedly sequencing counting cycle by one counting step after a respectively defined time interval;

wherein a transmission duration of a message cell is maximally selected at time intervals; and wherein, in addition to the updating of the counter readings of the counter devices under consideration within a counting cycle undertaken in response to arrival of message cells, the momentary counter readings of the individual counter devices are respectively decremented at least twice by the variable count value under consideration during a course of separate correction cycles and wherein a momentary value of the count variables current is retained for the respective counter device as a new reference time.

3. The method according to claim 2, wherein message cells are continuously transmitted via the offering media or dummy cells are transmitted in transmission pauses of message cells;

wherein the counter reading of the counter device allocated to the respective virtual connection is updated only in response to an arrival of a message cell; and wherein a correction cycle for one of the counter devices is additionally activated in response to an arrival of a message cell or dummy cell.

4. A circuit arrangement for checking the observance of the transmission bit rates of individual virtual connections for asynchronous transmission of message cells of a fixed length during the course of virtual connections in a switching equipment, the switching equipment accepting the message cells via offering media by means of counter devices individually allocated to the virtual connections, comprising:

a plurality of counter devices, that respectively correspond to a maximum plurality of virtual connections established via the offering media, respectively allocated to the offering media;

a read-write memory having a plurality of individual memory areas;

a calculating means connected to the read-write memory;

the counter devices being respectively formed of an individual memory area of the plurality of individual memory areas of the read-write memory and of the calculating means that is connected to the read-write memory and that is shared in common by all counter devices;

a momentary counter reading of a respective counter device, a maximum allowable counter reading, a time particular marking a time of arrival of a most recent message cell of a respective virtual connection and a normed count value under consideration for a respective bit rate class or a call-associated proportionality factor being stored as memory contents in the individual memory areas of the read-write memory;

upon appearance of message cells, the individual memory areas being individually involved in a control cycle based on a measure of a cell header contained in these message cells and indicating the respective virtual connection;

means for supplying the memory content of a respective memory area and a current time particular for said updating of the momentary counter reading of the respective counter means to the calculating means during the course of said control cycle;

upon transgression of the maximum allowable counter reading contained in the memory content just supplied by the just updated counter reading, the calculating means having means for supplying an alarm signal indicating an upward transgression of the transmission bit rate recited for the respective virtual connection and for decrementing the updated counter reading by the constant count value; and means for transmitting at least the momentary counter reading just updated by the calculating means and potentially decremented by the constant count value and the current time particular into the respective memory area while overriding the previously stored, momentary counter reading or the previously stored time particular.

5. The circuit arrangement according to claim 4, wherein the circuit arrangement further comprises a central counter arrangement fashioned as a module-n counter and wherein the current time particular is supplied by the central counter arrangement, the current time particular being supplied in the form of a momentary counter reading, the counting period n thereof corresponding at least to twice a maximum plurality of virtual connections respectively proceeding via the offering media and the momentary counter reading thereof being respectively varied by one count step in successive time intervals that respectively correspond to a transmission duration of a message cell.

6. The circuit arrangement according to claim 5, wherein the circuit arrangement further comprises:

a further counter arrangement fashioned as a modulo-n counter, a counting period n thereof corresponding to the maximum plurality of virtual connections proceeding via the respective offering medium and a momentary counter reading thereof being respectively varied by one count step in said successive time intervals;

means for successively driving the memory areas of the read-write memory for a separate correction cycle by the continuously changing, momentary counter reading of the further counter arrangement;

means for supplying the memory content of the memory area just driven as well as, proceeding from the central counter arrangement, the current time particular to the calculating means during the course of such a correction cycle, said calculating means first forming a time difference value weighted with said call-associated proportionality factor based on a measure of a time particular contained in the memory content supplied to it and based on a current time particular, the momentary counter reading also contained in the just supplied memory content being decremented by said time difference value for the formation of a corrected, momentary counter reading; and means for transmitting at least the corrected, momentary counter reading as well as the current time particular into the just driven memory area while overwriting a momentary counter reading previously stored therein or a time particular previously stored therein.

7. The circuit arrangement according to claim 6, wherein the memory area of the read-write memory under consideration for the respective message cell is involved in a control cycle for the duration of the appearance of message cells and one of the memory areas of the read-write memory is involved in a correction cycle for a duration of an appearance of message cells or dummy cells transmitted in transmission pauses of message cells.

8. A method for checking an observance of transmission bit rates of individual virtual connections for asynchronous transmission of message cells of fixed length during the course of virtual connections in a switching equipment, the switching equipment accepting the message cells via offering media by means of counter devices individually allocated to the virtual connections, a respective, momentary counter reading of said counter devices being both incremented by a constant count value as well as being decremented by a variable count value for an updating upon arrival of a message cell belonging to an allocated, virtual connection, said variable count value being proportional to a time difference between a time of arrival of a respective message cell and a time of arrival of a most recently received message cell of a same virtual connection serving as a reference time and being retained for the respective counter means, whereby an upward transgression of a maximum allowable counter reading by an updated, momentary counter reading of a respective counter means is respectively individually monitored for the individual counter means as a criterion for an upward transgression of the transmission bit rate of the respective virtual connection, comprising the steps of: providing a plurality of bit rate classes and defining a separate bit rate class for a defined, minimum transmission bit rate and for whole multiples thereof;

allocating a normed numerical value of one to the bit rate class corresponding to the minimum transmission bit rate, and allocating, a normed numerical value corresponding to the whole multiple of the minimum transmission bit rate respectively under consideration to the remaining bit rate classes;

assigning each of the virtual connections to one of the bit rate classes based on the measure of the transmission bit rate respectively recited therefor;

utilizing a call-associated proportionality factor for a duration of an existence of a respective virtual connection for calculation of said variable count value, said proportionality factor corresponding to a ratio of a normed count value allocated to the bit rate class under consideration to a normed count value allocated to a highest of the bit rate classes;

the time difference to be evaluated with the call-associated proportionality factor being calculated from momentary values of a time variable existing at the said times, the momentary value thereof changing within a periodically, repeatedly sequencing counting cycle by one counting step after a respectively defined time interval;

a transmission duration of a message cell being maximally selected at time intervals; and in addition to the updating of the counter readings of the counter devices under consideration within a counting cycle undertaken in response to arrival of message cells, the momentary counter readings of the individual counter devices being respectively decremented at least twice by the variable count value under consideration during a course of separate correction cycles and a momentary value of the count variables current being retained for the respective counter device as a new reference time.

9. The method according to claim 8, wherein message cells are continuously transmitted via the offering media or dummy cells are transmitted in transmission pauses of message cells;

wherein the counter reading of the counter device allocated to the respective virtual connection is updated only in response to an arrival of a message cell; and wherein a correction cycle for one of the counter devices is additionally activated in response to an arrival of a message cell or dummy cell.

* * * * *